United States Patent [19]

Aeschlimann

[11] 4,115,053
[45] Sep. 19, 1978

[54] DRY HEAT PROCESS FOR DYEING AND PRINTING ORGANIC MATERIAL

[75] Inventor: Peter Aeschlimann, Basel, Switzerland

[73] Assignee: Ciba-Geigy AG, Basel, Switzerland

[21] Appl. No.: 722,003

[22] Filed: Sep. 9, 1976

[30] Foreign Application Priority Data

Sep. 15, 1975 [CH] Switzerland ............... 11934/75
Sep. 15, 1975 [CH] Switzerland ............... 11935/75

[51] Int. Cl.² .................. D06P 5/00; C09D 11/00
[52] U.S. Cl. .................................. 8/2.5 A; 8/1 F;
8/39 A; 8/39 B; 8/39 C; 8/54; 8/163; 8/177 R;
8/178 R; 8/179; 106/22
[58] Field of Search ............ 8/1 F, 2.5 R, 2.5 A,
8/39 B, 39 A, 39 C, 163; 106/22

[56] References Cited

U.S. PATENT DOCUMENTS 2,944,870   7/1960   Atkinson et al. .................. 8/39

FOREIGN PATENT DOCUMENTS 1,908,096   9/1969   Fed. Rep. of Germany.

*Primary Examiner*—A. Lionel Clingman
*Attorney, Agent, or Firm*—Wenderoth, Lind & Ponack

[57] ABSTRACT

The present invention provides a dry heat process for dyeing and printing textile material, which comprises the use of fibre-reactive disperse dyes of the formula (1)

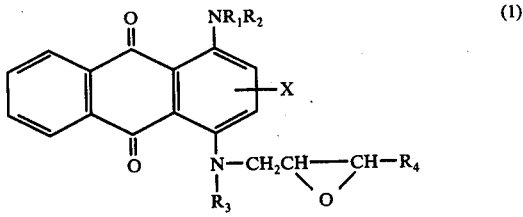

wherein
$R_1$ represents hydrogen or alkyl,
$R_2$ represents hydrogen, alkyl, cycloalkyl, aralkyl or substituted or unsubstituted phenyl, while $R_1$ and $R_2$ together with the nitrogen atom to which they are attached can also form a 5- to 7-membered heterocyclic ring,
$R_3$ represents hydrogen or alkyl,
$R_4$ represents hydrogen or alkyl of 1 to 2 carbon atoms,
X represents hydrogen, chlorine, bromine, cyano or $COOR_5$, and
$R_5$ represents alkyl,
a process for the manufacture thereof, the anthraquinone dyes for dyeing and printing organic fibrous material, in particular natural and synthetic polyamides, and the material which is dyed with said dyes.

13 Claims, No Drawings

DRY HEAT PROCESS FOR DYEING AND PRINTING ORGANIC MATERIAL

The present invention provides a dry heat process for dyeing and printing textile material, which comprises the use of fibre-reactive disperse dyes of the formula (1)

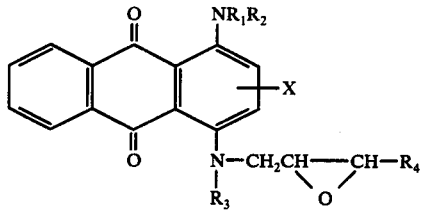

wherein
$R_1$ represents hydrogen or alkyl,
$R_2$ represents hydrogen, alkyl, cycloalkyl, aralkyl or substituted or unsubstituted phenyl, whilst $R_1$ and $R_2$ together with the nitrogen atom to which they are attached can also form a 5- to 7-membered heterocyclic ring,
$R_3$ represents hydrogen or alkyl,
$R_4$ represents hydrogen or alkyl of 1 to 2 carbon atoms,
X represents hydrogen, chlorine, bromine, cyano or $COOR_5$, and
$R_5$ represents alkyl,
a process for the manufacture thereof, the anthraquinone dyes for dyeing and printing organic fibrous material, in particular natural and synthetic polyamides, and the material which is dyed with said dyes.

By fibre-reactive dyes are meant those dyes which are capable of reacting with the hydroxyl groups of cellulose or with the amino groups of natural or synthetic polyamides to form covalent chemical bonds.

Alkyl groups represented by $R_1$, $R_2$, $R_3$, $R_4$ or $R_5$ can be the same or different, straight-chain or branched. In particular, they are low molecular alkyl groups of 1 to 6 carbon atoms, such as methyl, ethyl, propyl, iso-propyl, sec. butyl. A cycloalkyl group represented by $R_2$ is in particular the cyclohexyl group and where $R_2$ is an aralkyl group, such a group is chiefly the benzyl or phenethyl group. Preferably $R_1$, $R_3$, $R_4$ and X represent hydrogen and $R_2$ represents alkyl of 1 to 6 carbon atoms or cyclohexyl, in particular the isopropyl and sec. butyl group.

Where $R_1$ and $R_2$ together with the nitrogen atom to which they are attached form a 5- to 7-membered heterocyclic ring, they represent for example the piperidine, pyrrolidine or morpholine radical.

A phenyl radical represented by $R_2$ can contain substituents. Examples of suitable substituents are: alkyl groups, such as methyl, ethyl, or iso-propyl; alkoxy groups, such as methoxy or ethoxy; acylamino groups, such as acetylamino or benzoylamino; and halogen atoms, such as chlorine or bromine atoms.

Similar dyes of the type described in formula (1) have been disclosed in U.S. Pat. No. 2,944,874. However, they were not conceived for the particular requirements of transfer printing and were therefore not suitable. It is known that both chemical and, in particular, physical processes are of importance in sublimation transfer printing. The dye molecule must therefore be so constructed that it fulfills all requirements. A transfer printing process for polyamide using fibre-reactive dyes is also disclosed in German Offenlegungsschrift No. 1,908,496; but the epoxide group especially suitable for this purpose is not cited therein.

The fibre-reactive dyes of the formula (1) are obtained by reacting an anthraquinone compound of the formula

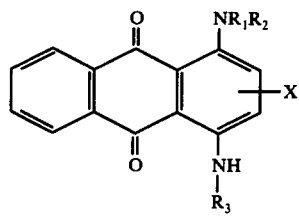

wherein $R_1$, $R_2$, $R_3$ and X are as defined in formula (1), with an epoxide compound of the general formula

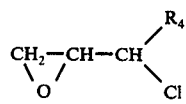

to give the corresponding intermediate of the formula (3)

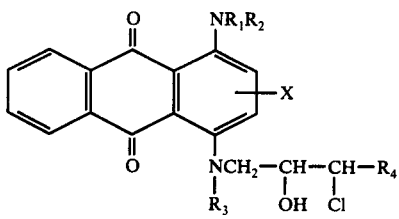

In a further step the epoxide ring is closed with the elimination of HCl to give the end product of the general formula (1).

The anthraquinone starting products of the formula (2) are known and can be obtained by methods which are known per se.

Suitable alkylating agents are epichlorohydrin and derivatives thereof. Epichlorohydrin is used with advantage.

The reaction of the starting products of the formula (2) with the epichlorohydrins is carried out in known manner in weak protonic acids, such as concentrated acetic acid, or in inert solvents with the addition of protonic or Lewis acids, for example acetic acid or boron trifluoride.

Examples of suitable inert organic solvents are: acetone, dioxane, methyl ethyl ketone, toluene, chlorobenzene, trichloroethylene, tetrachloroethane or dimethyl formamide.

The reaction is preferably carried out at elevated temperature, the choice of temperature depending primarily on the starting materials and the alkylating agent.

The further cyclisation reaction takes place in an organic solvent, preferably benzene, chlorobenzene, toluene, or xylene, by vigorously stirring the reaction mixture in an excess of a highly concentrated (50% <) alkali lye at a temperature between 20° and 50° C for 2 to 12 hours. The reaction course can be easily followed by thin-layer chromatography. The cyclised end product of the formula (1) has excellent solvent solubility and can be dried by adding drying agents, such as sodium sulphate or NaOH, KOH (solid), and concentrated. It is also possible to isolate the end product by steam distillation.

The dyes of the present invention are suitable for dyeing and printing a wide variety of fibres, chiefly organic fibres, for example polyvinyl chloride, polyamide and polyurethane fibres; fibres of linear high molecular esters of aromatic polycarboxylic acids and polyhydric alcohols, for example polyethylene glycol terephthalate or poly-(1,4-cyclohexanedimethylol)-terephthalate fibres, polymers and copolymers of acrylonitrile and asymmetric dicyanoethylene, but especially natural and synthetic polyamide fibres, for example, both pure wool or pure polyamides as well as blends thereof and blends with other synthetic or natural materials.

Provided the machines suitable for the purpose are available, the fibrous material can be printed or dyed according to the invention in any desired form, for example in the form of flocks, slubbing, yarn, texturised fibres, wovens, non-wovens of fibres, ribbons, webs, textile floor coverings, such as woven needle-felt carpets or hanks of yarn which can be in the form of webs or cut and ready finished, or the material can also be in the form of sheets.

The above fibrous materials are dyed with the fibre-reactive anthraquinone dyes of this invention, which are sparingly soluble in water, from an aqueous dispersion. It is therefore advantageous to divide the disperse dyes of the formula (1) finely by grinding them with dispersants and possibly with further grinding assistants.

Since the dyes of the present invention are fibre-reactive and at the same time are sublimable, they are preeminently suitable for transfer printing. The transfer printing process can be carried out with the dyes of the present invention for example in the following way. Printing inks which contain at least one finely divided fibre-reactive disperse dye of the formula (1), optionally a binder which is stable below 230° C, water and/or an organic solvent, are applied to an inert carrier and dried, then the treated side of the carrier is brought into contact with the surface of the organic material to be dyed, carrier and material are subjected, with or without mechanical pressure, to a heat treatment of 150° to 230° C, advantageously 170° to 210° C, over the course of 2 to 60 seconds, and the dyed material is then separated from the carrier.

Very good results are also obtained by transferring under a vacuum of preferably 2 to 150 Torr, when very brief transfer times of app. 3 to 15 seconds at temperatures of 130° to 200° C suffice.

The inert intermediate or auxiliary carrier required for the dry heat transfer, i.e. a carrier for which the dyes used according to the invention have no affinity, is advantageously a flexible, preferably three-dimensionally stable, sheet material, such as a ribbon, strip, or a foil, desirably with a smooth surface, which is stable to heat and can consist of a wide variety of material, chiefly nontextile material, e.g. metal, such as a steel or aluminium sheet, or an endless ribbon of stainless steel, plastic or paper, which can, if appropriate, be coated with a film of vinyl resin, ethyl cellulose polyurethane resin or teflon.

If necessary, the printing inks used according to the invention also contain in addition to the fibre-reactive disperse dyes at least one binder which is stable below 230° C and acts as thickener for the printing batch and as at least temporary binder of the dye on the carrier to be printed. Synthetic, semisynthetic, and natural resins, i.e. both polymerisation and polycondensation and polyaddition products, are suitable for use as such binders. In principle, it is possible to use all resins and binders customarily employed in the printing ink and paint industry. The binders should not melt at the transfer temperature, react chemically in the air or with themselves (e.g. crosslink), have little or no affinity for the dyes used, but solely maintain these at the printed area of the inert carrier without modifying them, and remain on the carrier in their entirety after the heat transfer process. Preferred binders are those which are soluble in organic solvents and dry rapidly, for example, in a warm current of air, and form a fine film on the carrier. Suitable water-soluble binders are: alginate, tragacanth, carubin (from locust bean gum), dextrin, more or less etherified or esterified mucilages, hydroxyethyl cellulose or carboxymethyl cellulose, water-soluble polyacrylic amides or, above all, polyvinyl alcohol; and suitable binders which are soluble in organic solvents are cellulose esters, such as nitrocellulose, cellulose acetate or butyrate, and, in particular, cellulose ethers, such as methyl, ethyl, propyl, isopropyl, benzyl, hydroxypropyl, or cyanoethyl cellulose, and mixtures thereof.

The dyes dispersed in the printing ink must have in the main a particle size of $< 10 \mu$, preferably $< 2 \mu$.

Besides water, practically all water-miscible and water-immiscible organic solvents or solvent mixtures which boil at atmospheric pressure at temperatures below 220°, preferably below 150° C, and which have sufficient solubility or emulsifiability (dispersibility) for the dyes and the binders used, are suitable for obtaining the printing inks. The following may be cited as examples of suitable organic solvents: aliphatic and aromatic hydrocarbons, for example, n-heptane, cyclohexane, petroleum ether, benzene, xylene or toluene; halogenated hydrocarbons, such as methylene chloride, trichloroethylene, perchloroethylene or chlorobenzene; nitrated aliphatic hydrocarbons, such as nitropropane; aliphatic amides, such as dimethyl formamide or mixtures thereof; and glycols, such as ethylene glycol, or ethylene glycol monoalkyl ethers, such as ethylene glycol monoethyl ether, diethyl carbonate, dimethyl carbonate, or esters of aliphatic monocarboxylic acids, such as ethyl acetate, propyl acetate, butyl acetate, β-ethoxyethyl acetate; aliphatic or cycloaliphatic ketones, for example methyl ethyl ketone, methyl isobutyl ketone, cyclohexanone, isophoron, mesityl oxide, or diacetone alcohol and alcohols, such as methanol, n-propanol, isopropanol, n-butanol, tert. butanol, sec. butanol, or benzyl and preferably ethanol. Mixtures of these solvents, for example, a mixture of methyl ethyl ketone and ethanol in the ratio 1:1 to 1:25, are also suitable.

Particularly preferred solvents are esters, ketones, or alcohols which boil below 120° C, such as butyl acetate, acetone, methyl ethyl ketone, ethanol, isopropanol or butanol.

The desired viscosity of the printing inks can be adjusted by addition of the cited binders, or by dilution with water or a suitable solvent.

The dyeing preparations of the present invention are liquid, pasty or dry. When liquid, they contain as a rule 0.1 to 80, advantageously 1 to 40, percent by weight of one or more of the fibre-reactive disperse dyes, and when dry, 10 to 80 percent by weight and optionally 0.5 to 50 percent by weight of a binder, referrd to the total weight of the preparation, and they can be used direct or after dilution as printing inks according to the invention.

The suitability of the printing inks can be improved by adding optional components, for example plasticisers, swelling agents, high boiling solvents, for example, tetralin or decalin, ionogenic or non-ionogenic surface active compounds, for example the condensation product of 1 mole of octylphenol with 8 to 10 moles of ethylene oxide.

The dyeing preparations and printing inks (solutions, dispersions, emulsions) used according to the invention are obtained by methods which are known per se by dissolving or dispersing the fibre-reactive disperse dyes in water and/or a solvent or a solvent mixture, advantageously in the presence of a binder which is stable below 230° C.

The filtered or unfiltered printing inks are applied to the inert carrier for example by spraying, coating, or advantageously by printing the carrier on parts of the surface or over the entire surface.

After the printing inks have been applied to the inert carrier, they are then dried, for example with the aid of a flow of warm air or by infrared irradiation, with or without recovery of the solvent employed.

If the carriers are printed, a wide variety of printing methods can be employed, for example relief printing (e.g. letter-press printing, flexographic printing), intaglio printing (e.g. roller printing), or silk-screen printing (e.g. rotary screen printing, flat-screen printing).

The transfer is carried out in the conventional manner by the action of heat. The treated carriers are brought into contact with the textile material and kept at 120° to 230° C until the disperse dyes applied to the carrier are transferred to the textile material. As a rule 3 to 60 seconds suffice for this.

The heat can be applied in various known ways, for example by passage through a hot heater drum, a tunnel-shaped heating zone or by means of a heated cyclinder, advantageously in the presence of an unheated or heated backing roll which exerts pressure or of a hot calender, or also by means of a heated plate (warm press), the various devices being preheated by steam, oil, infrared irradiation or microwaves to the required temperature, with or without vacuum, or being located in a preheated heating chamber.

When the heat treatment is terminated, the printed good are removed from the carrier. The printed material requires no aftertreatment, neither a steam treatment to fix the dyestuff nor washing to improve the fastness properties.

The problem of attaining strong, wetfast and lightfast dyeings and prints on polyamide and mixtures thereof with synthetic and natural fibrous material by means of the heat transfer process while maintaining optimum mechanical fibre properties, is virtually solved with the aid of the fibre-reactive dyes of the present invention. The prints obtained by the process of this invention are characterised by sharply delineated, finely etched contours.

The invention is illustrated by the following Examples but is not restricted to what is described therein. The parts and percentages are by weight.

EXAMPLE 1

2.94 g of 1-sec. butylamino-4-aminoanthraquinone are dissolved in 15 ml of chlorobenzene and the solution is treated with 1.45 g of epichlorohydrin and 0.1 ml of boron trifluoride ethyl etherate. After a reaction time of 12 hours at 70° C, the batch is stirred until it has cooled to room temperature, when the polar intermediate of the formula

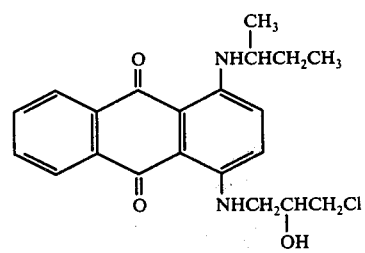

can be filtered off pure. The product, which is moist with chlorobenzene, is suspended in 20 ml of chlorobenzene and the suspension is vigorously stirred for 12 hours at 50° to 60° C with 8 g of sodium hydroxide solution (50%). The cyclisation proceeds quantitatively. After steam distillation, a blue dye of the formula

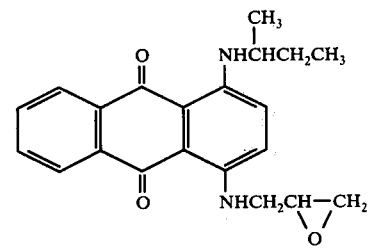

is obtained. It can be readily filtered.

EXAMPLES 2 to 46

The procedure of Example 1 is repeated, except that the compounds listed in the following table are used as substrates instead of 1-sec. butylamino-4-aminoanthraquinone. After reaction with the appropriate epoxide reagent and subsequent cyclisation, the corresponding fibre-reactive disperse dyes are obtained as products.

Table

| Nr. | Substrate R₁ | R₂ | R₃ | X | Epoxide reagent R₄ | Product R₁ | R₂ | R₃ | R₄ | X |
|---|---|---|---|---|---|---|---|---|---|---|
| 2 | H | —CH₃ | H | H | H | H | —CH₃ | H | H | H |
| 3 | H | —CH₂CH₂CH₃ | H | H | H | H | —CH₂CH₂CH₃ | H | H | H |
| 4 | H | —CH₂(CH₂)₂CH₃ | H | H | H | H | —CH₂(CH₂)₂CH₃ | H | H | H |
| 5 | H | —CH₃ | —CH₃ | H | H | H | —CH₃ | —CH₃ | H | H |
| 6 | H | —CH₂CH₃ | —CH₂CH₃ | H | H | H | —CH₂CH₃ | —CH₂CH₃ | H | H |
| 7 | H | —CH₂CH₃ | —CH₃ | H | H | H | —CH₂CH₃ | —CH₃ | H | H |
| 8 | H | —CH(CH₃)₂ | —CH₃ | H | H | H | —CH(CH₃)₂ | —CH₃ | H | H |
| 9 | H | —CH(CH₃)₂ | —CH₃ | H | H | H | —CH(CH₃)₂ | —CH₃ | H | H |
| 10 | H | —CH(CH₃)₂C₂H₅ | —CH₃ | H | H | H | —CH(CH₃)₂C₂H₅ | —CH₃ | H | H |
| 11 | H | piperidinyl | H | H | H | H | piperidinyl | H | H | H |
| 12 | H | —CH(CH₃)₂ | H | —CN | H | H | —CH(CH₃)₂ | H | H | —CN |
| 13 | H | —CH(CH₃)₂ | H | —COOCH₃ | H | H | —CH(CH₃)₂ | H | H | —COOCH₃ |
| 14 | H | —CH(CH₃)₂ | H | —NO₂ | H | H | —CH(CH₃)₂ | H | H | —NO₂ |
| 15 | H | —CH(CH₃)₂ | H | —Cl | H | H | —CH(CH₃)₂ | H | H | —Cl |
| 16 | H | —CH(CH₃)₂ | H | —Br | H | H | —CH(CH₃)₂ | H | H | —Br |
| 17 | H | —CH₃ | H | —CN | H | H | —CH₃ | H | H | —CN |
| 18 | H | —CH₃ | H | —COOCH₃ | H | H | —CH₃ | H | H | —COOCH₃ |
| 19 | H | —CH₃ | H | —COOC₂H₅ | H | H | —CH₃ | H | H | —COOC₂H₅ |
| 20 | H | —CH₃ | H | —NO₂ | H | H | —CH₃ | H | H | —NO₂ |
| 21 | H | —CH₃ | H | —Cl | H | H | —CH₃ | H | H | —Cl |
| 22 | H | —CH₃ | H | —Br | H | H | —CH₃ | H | H | —Br |
| 23 | H | —CH₂CH₃ | H | —CN | H | H | —CH₂CH₃ | H | H | —CN |
| 24 | H | —CH₂CH₃ | H | —COOCH₃ | H | H | —CH₂CH₃ | H | H | —COOCH₃ |
| 25 | H | —CH₂CH₃ | H | —COOC₂H₅ | H | H | —CH₂CH₃ | H | H | —COOC₂H₅ |
| 26 | H | —CH₂CH₃ | H | —NO₂ | H | H | —CH₂CH₃ | H | H | —NO₂ |
| 27 | H | —CH₂CH₃ | H | —Cl | H | H | —CH₂CH₃ | H | H | —Cl |
| 28 | H | —CH₂CH₃ | H | —Br | H | H | —CH₂CH₃ | H | H | —Br |
| 29 | H | —CH₃ | H | H | —CH₃ | H | —CH₃ | H | —CH₃ | H |
| 30 | H | —CH₂CH₃ | H | H | —CH₃ | H | —CH₂CH₃ | H | —CH₃ | H |
| 31 | H | —CH(CH₃)₂ | H | H | —CH₃ | H | —CH(CH₃)₂ | H | —CH₃ | H |
| 32 | H | —CH(CH₃)₂CH₃ | H | H | —CH₃ | H | —CH(CH₃)₂CH₃ | H | —CH₃ | H |
| 33 | H | —CH(CH₁)₂CH₂CH₃ | H | H | —CH₃ | H | —CH(CH₁)₂CH₂CH₃ | H | —CH₃ | H |
| 34 | H | —CH₂(CH₂)₃CH₃ | H | H | —CH₃ | H | —CH₂(CH₂)₃CH₃ | H | —CH₃ | H |
| 35 | H | —CH₃ | H | H | —CH₃ | H | —CH₃ | H | —CH₃ | H |
| 36 | H | —CH(CH₃)₂ | H | —CN | —CH₃ | H | —CH(CH₃)₂ | H | —CH₃ | —CN |
| 37 | H | —CH(CH₃)₂ | H | —COOCH₃ | —CH₃ | H | —CH(CH₃)₂ | H | —CH₃ | —COOCH₃ |
| 38 | H | —CH(CH₃)₂ | H | —Cl | —CH₃ | H | —CH(CH₃)₂ | H | —CH₃ | —Cl |
| 39 | H | —CH₃ | H | —CN | —CH₃ | H | —CH₃ | H | —CH₃ | —CN |

Table-continued
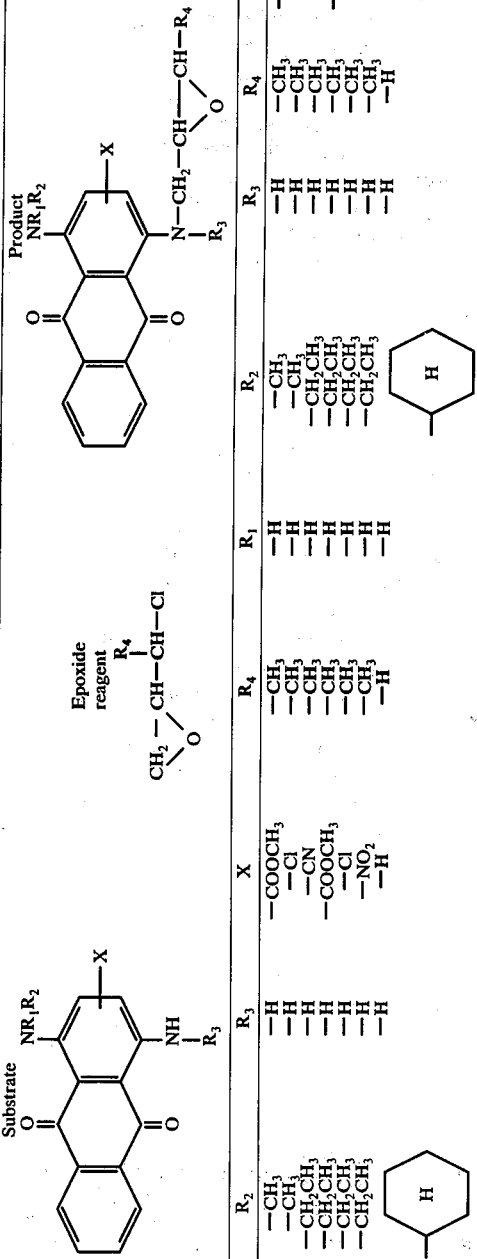
| Nr. | Substrate R₁ | R₂ | R₃ | X | Epoxide reagent R₄ | Product R₁ | R₂ | R₃ | R₄ | X |
|---|---|---|---|---|---|---|---|---|---|---|
| 40 | —H | —CH₃ | —H | —COOCH₃ | —CH₃ | —H | —CH₃ | —H | —CH₃ | —COOCH₃ |
| 41 | —H | —CH₃ | —H | —Cl | —CH₃ | —H | —CH₃ | —H | —CH₃ | —Cl |
| 42 | —H | —CH₂CH₃ | —H | —CN | —CH₃ | —H | —CH₂CH₃ | —H | —CH₃ | —CN |
| 43 | —H | —CH₂CH₃ | —H | —COOCH₃ | —CH₃ | —H | —CH₂CH₃ | —H | —CH₃ | —COOCH₃ |
| 44 | —H | —CH₂CH₃ | —H | —Cl | —CH₃ | —H | —CH₂CH₃ | —H | —CH₃ | —Cl |
| 45 | —H | —CH₂CH₃ | —H | —NO₂ | —CH₃ | —H | —CH₂CH₃ | —H | —CH₃ | —NO₂ |
| 46 | —H | ⟨cyclohexyl-CH₃⟩ | —H | —H | —H | —H | ⟨cyclohexyl-CH₃⟩ | —H | —H | —H |

EXAMPLE 47

21 g of 1-isopropylamino-4-aminoanthraquinone are dissolved in 150 ml of 100% acetic acid at 70° C and the solution is treated with 12 ml of epichlorohydrin. After stirring for a further 8 hours at 70° C, thin-layer chromatography shows the reaction to be 95% complete. The intermediate is precipitated in pure form by adding 80 ml of water and then filtered off. It is subsequently washed with dilute acetic acid and water and dried at 70° C.

The dried dye is made into a paste with 100 ml of benzene and stirred with 20 g of very finely ground potassium hydroxide until homogeneous. Then 5 mol of water are added dropwise and the batch is stirred overnight vigorously. The reaction is brought to completion by subsequently stirring for 3 hours at 50° C. A readily stirrable dye solution is obtained. This solution is dried at room temperature by adding calcined sodium sulphate, filtered, washed thoroughly with benzene, and the filtrate is evaporated to dryness to yield 19 g of a very pure, blue dye powder with a melting point of 119°–122° C.

EXAMPLE 48

(a) With cooling, 5 parts of the blue dye of the formula

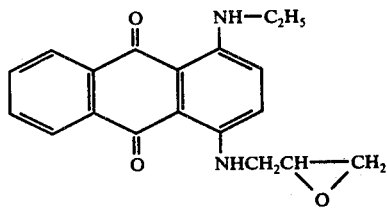

6.5 parts of ethyl cellulose and 88.5 parts of ethanol are ground for 2 hours in a ball mill and simultaneously homogenised. The grinding elements are separated and a ready for use printing ink is obtained.

(b) This printing ink is applied to the entire surface of a smooth parchment paper by printing and subsequently dried to give a carrier paper which is suitable for the transfer printing process.

(c) A polyamide 66 fabric is laid on the pretreated carrier and brought into contact with the treated side of the carrier by applying pressure. Carrier and fabric are then heated for 30 seconds at 195° C using a heating plate. A second unheated insulated plate ensures uniform contact. The coloured fabric is then separated from the carrier. A polyamide fabric which is dyed in a strong blue shade and has excellent wetfastness and good lightfastness properties is obtained.

EXAMPLE 49

The procedure of Example 48 is repeated using corresponding amounts of the dye of the formula

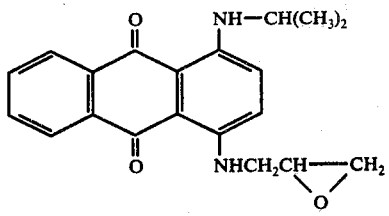

A strong, blue print with good tone-in-tone colouration, good lightfastness and very good wetfastness properties is obtained by using as printing substrate a blend of wool and polyamide.

EXAMPLE 50

2 g of the dye obtained in Example 1 are dispersed in 4000 ml of water. To this dispersion are added as swelling agent 12 g of the sodium salt of o-phenylphenol and 12 g of diammonium phosphate and 100 g of polyethylene glycol yterephthalate are dyed therein for 1½ hours at 95° to 98° C. The dyeing is rinsed and given an aftertreatment with aqueous sodium hydroxide solution and a dispersant.

A blue dyeing which is fast to washing and light is obtained.

I claim:

1. In a dry heat process for the dyeing or printing of organic textile material selected from the group consisting of polyvinyl chloride, polyamides, polyurethanes, polyesters, polymers and copolymers of acrylonitrile, and polymers and copolymers of dicyanoethylene which comprises bringing the textile material to be dyed or printed into contact with a treated transfer carrier bearing on at least a portion of at least one surface thereof at least one heat transferable organic disperse dyestuff, heating the said carrier while in contact with the said textile material at a temperature and for a time period sufficient to effect transfer of dyestuff from the carrier to the textile material, and separating the dyed or printed textile material from the carrier, the improvement wherein the transfer carrier carries at least one reactive disperse dyestuff of the formula

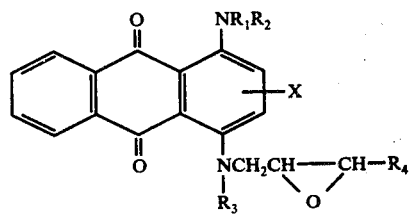

wherein $R_1$ represents hydrogen or alkyl, $R_2$ represents hydrogen, alkyl, cycloalkyl, aralkyl or substituted or unsubstituted phenyl, or $R_1$ and $R_2$ together with the nitrogen atom to which they are attached can also form a 5- to 7-membered heterocyclic ring, $R_3$ represents hydrogen or alkyl, $R_4$ represents hydrogen or alkyl of 1 to 2 carbon atoms, X represents hydrogen, chlorine, bromine, cyano or $COOR_5$, and $R_5$ represents alkyl.

2. A process according to claim 1 wherein $R_4$ represents a hydrogen atom.

3. A process according to claim 1 wherein $R_1$, $R_3$ and $R_4$ represent hydrogen and $R_2$ represents alkyl of 1 to 6 carbon atoms or cyclohexyl.

4. A process according to claim 1 wherein $R_1$, $R_3$ and $R_4$ represent hydrogen and $R_2$ represents iso-propyl.

5. A process according to claim 1 wherein X represents hydrogen.

6. A process according to claim 1 wherein the transfer carrier is printed with at least one printing ink which contains at least one reactive disperse dye of the formula set forth, a binder which is stable below 230° C and water or a mixture of water and an organic solvent, drying said printing ink or inks, bringing the treated side of the carrier into contact with the surface of the organic textile material to be dyed or printed, thereafter subjecting carrier and material to be dyed or printed, while in contact, to a heat treatment of 150° to 230° C for 3 to 60 seconds, and then separating the dyed or printed material from the carrier.

7. In a transfer carrier suitable for use in a dry heat process for the dyeing or printing of organic textile material which comprises an inert, flexible, heat stble sheet bearing on at least a portion of at least one face thereof at least one heat transferable organic disperse dyestuff, the improvement wherein the carrier carries at least one reactive disperse dyestuff of the formula

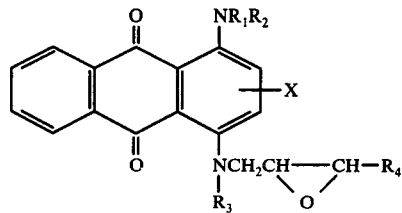

wherein
$R_1$ represents hydrogen or alkyl,
$R_2$ represents hydrogen, alkyl, cycloalkyl, aralkyl or substituted or unsubstituted phenyl, or $R_1$ and $R_2$ together with the nitrogen atom to which they are attached can also form a 5- to 7-membered heterocyclic ring,
$R_3$ represents hydrogen or alkyl,
$R_4$ represents hydrogen or alkyl of 1 to 2 carbon atoms,
X represents hydrogen, chlorine, bromine, cyano or $COOR_5$, and
$R_5$ represents alkyl.

8. A carrier according to claim 7 wherein the sheet material is paper, an aluminum sheet or steel.

9. A carrier according to claim 7 which is treated with a binder that dries rapidly when applied from the liquid phase and forms a fine film on said carrier.

10. A carrier according to claim 7 which is printed with at least one printing ink which contains at least one reactive disperse dye of the formula set forth, a binder which is stable below 230° C and water or a mixture of water and an organic solvent.

11. A carrier according to claim 7 which is printed with at least one organic printing ink comprising a cellulose ether or ester as binder, or with an aqueous printing ink comprising polyvinyl alcohol as binder.

12. Organic textile material dyed or printed according to the process of claim 1.

13. Synthetic or natural polyamide textile material dyed or printed according to the process of claim 1.

* * * * *